United States Patent
Ji et al.

(10) Patent No.: US 7,344,126 B2
(45) Date of Patent: Mar. 18, 2008

(54) EQUIPMENT OF MULTI-ROTORS ZIGZAG HIGH-GRAVITY ROTATING BEDS

(75) Inventors: Jianbing Ji, Hangzhou (CN); Zhichao Xu, Hangzhou (CN); Yunliang Yu, Hangzhou (CN)

(73) Assignee: Zhejiang University of Technology, Zhejiang Province (CN)

( * ) Notice: Subject to any disclaimer, the term of this patent is extended or adjusted under 35 U.S.C. 154(b) by 494 days.

(21) Appl. No.: 11/103,451

(22) Filed: Apr. 12, 2005

(65) Prior Publication Data
US 2006/0222534 A1   Oct. 5, 2006

(30) Foreign Application Priority Data
Feb. 24, 2005   (CN)   ................... 2005 1 0049145

(51) Int. Cl.
   *B01F 3/04*   (2006.01)
(52) U.S. Cl. .......................... 261/84; 261/89
(58) Field of Classification Search .............. 261/83, 261/84, 89, 91, 93, 78.2; 417/423.1
See application file for complete search history.

(56) References Cited

U.S. PATENT DOCUMENTS

| | | | | |
|---|---|---|---|---|
| 940,947 | A * | 11/1909 | Steger | 261/89 |
| 2,673,723 | A * | 3/1954 | Keen | 261/28 |
| 3,095,149 | A * | 6/1963 | Peebles | 239/224 |
| 3,474,597 | A * | 10/1969 | Eckert | 96/286 |
| 3,758,085 | A * | 9/1973 | Mentschel | 261/89 |
| 4,339,398 | A * | 7/1982 | Feres | 261/89 |
| 4,397,794 | A * | 8/1983 | Pilo | 261/79.2 |
| 4,995,945 | A * | 2/1991 | Craig | 202/177 |
| 7,032,893 | B2 * | 4/2006 | Sotoyama et al. | 261/89 |

FOREIGN PATENT DOCUMENTS

CN   01134321.4 A   5/2003

* cited by examiner

*Primary Examiner*—Scott Bushey
(74) *Attorney, Agent, or Firm*—Perkins Coie LLP; Manni Li

(57) ABSTRACT

The equipment of high-gravity multi-rotors zigzag rotating beds according to the present invention comprises a casing, a gas inlet and a liquid outlet being provided at the bottom of the casing, a gas outlet and a liquid inlet being provided at the top of the casing, a rotating shaft being provided at the center of the casing and going through the top and the bottom of the casing, a plurality of rotors being installed in series on the rotating shaft and being arranged in layers from top to bottom, and a middle feed inlet being provided on the side of the casing and being communicated with zigzag channels. The rotor comprises a mobile disk fixed on the rotating shaft and an immobile disk fixed on the casing, A series of concentric mobile and immobile circular baffle-sheets are fitted on the mobile disk and the immobile disk respectively. The series of concentric mobile and immobile circular baffle-sheets with different diameters are arranged in staggered form to compose the zigzag channels, and the first passage is set at the downside of the rotor and the second passage is set at the center on the top of the rotor. The first and second passages are communicated with the zigzag channels, and the second passage on the top rotor in the casing is communicated with the gas outlet and the liquid inlet; the first passage of the bottom rotor in the casing is communicated with the gas inlet and the liquid outlet; the second passage of the other rotors is communicated with the first passage of the above rotor.

8 Claims, 1 Drawing Sheet

EQUIPMENT OF MULTI-ROTORS ZIGZAG HIGH-GRAVITY ROTATING BEDS

FIELD OF THE INVENTION

The present invention relates to a liquid-gas contacting equipment, and, more particularly, to an equipment of multi-rotors zigzag high-gravity rotating beds, which can be widely used in various liquid-gas contacting applications, such as absorption, distillation, chemical reaction and nano-material preparation in chemical industry, petrochemical industry, biochemical industry, pharmaceutical industry, metallurgical industry and light industry.

BACKGROUND OF THE INVENTION

A high gravity rotating bed is characterized by small size and thus is reputed as "transistor" in chemical processing equipment. Before this invention, in the existing high-gravity rotating beds, the rotors in high-gravity rotating beds rotate together, and gas and liquid contact each other counter-currently in the rotors under a centrifugal force far greater than gravity. The packing in the rotors mainly are porous packing and plate-packing composed by metal mesh. The contacting time of gas and liquid in the packing is too short, which is unfavorable for the contact and mass transfer of gas and liquid. Moreover, the liquid in the rotors can not be distributed uniformly, namely, liquid and gas flow in short path or liquid flows in channel-flow form, which results in decreasing of mass transfer efficiency. Because the rotors rotate along with the shaft, it is quite difficult for the existing rotating beds to charge the middle-feed in continuous distillation in a single rotating bed, therefore, at least two rotating beds are required to carry out continuous distillation.

In addition, the high gravity rotating bed disclosed by China patent 01134321.4 merely applies to the occasion of small flux of gas and liquid. The structure of the gas outlet and the liquid inlet of the high gravity rotating bed is relative complicated, liquid is easily back-mixing in the rotors, and the flux of both gas and liquid is small and the pressure drops are large. Furthermore, the equipment has only one rotor, and the contact between gas and liquid is not sufficient.

SUMMARY OF THE INVENTION

The object of this invention is to overcome the defects of the above existing technology by providing an equipment of multi-rotors zigzag high-gravity rotating beds which are simple and reasonable in structure and efficient in use.

The equipment of high-gravity multi-rotors zigzag rotating beds according to the present invention comprises a casing, a gas inlet and a liquid outlet being provided at the bottom of the casing, a gas outlet and a liquid inlet being provided at the top of the casing, a rotating shaft being provided at the center of the casing and going through the top and the bottom of the casing, a plurality of rotors being installed in series on the rotating shaft and being arranged in layers from top to bottom, and a middle feed inlet being provided on the side of the casing and being communicated with zigzag channels. The rotor comprises a mobile disk fixed on the rotating shaft and an immobile disk fixed on the casing, A series of concentric mobile and immobile circular baffle-sheets are fitted on the mobile disk and the immobile disk respectively. The series of concentric mobile and immobile circular baffle-sheets with different diameters are arranged in staggered form to compose the zigzag channels, and the first passage is set at the downside of the rotor and the second passage is set at the center on the top of the rotor. The first and second passages are communicated with the zigzag channels, and the second passage on the top rotor in the casing is communicated with the gas outlet and the liquid inlet; the first passage of the bottom rotor in the casing is communicated with the gas inlet and the liquid outlet; the second passage of the other rotors is communicated with the first passage of the above rotor.

The favorable effects of this invention are as below: 1. The structure of the equipment is simple, rational and compact, and the gas outlet and the liquid inlet are positioned separately, which makes the equipment convenient in machining and operation. 2. A number of rotors arranged in layers are installed in a casing, which increases mass transferring capability of a single equipment. 3. A liquid directing tube is installed in the eye (central hole) of the immobile disk, so as to direct liquid from the top of the immobile disk to the mobile disk. 4. The upper portion of the mobile baffle-sheets is perforated, the function of which, for gas phase, is to increase gas flow area and decreases gas phase resistance; for liquid phase, is to throw the liquid onto the immobile baffle-sheets from the holes of the mobile baffle-sheets; some liquid rebounds from the immobile baffle-sheets onto the upper portion of the mobile baffle-sheets and then is thrown back onto the immobile baffle-sheet again by the mobile baffle-sheets rotating at high speed; so this kind of mobile baffle-sheets not only increases gas and liquid flux, but also can prevent liquid from back mixing. (The jalousie-type mobile baffle-sheets have similar effect as the perforated mobile baffle-sheets).

BRIEF DESCRIPTION OF THE DRAWINGS

These and/or other aspects and advantages of the invention will become apparent and more readily appreciated from the following description of the preferred embodiments, taken in conjunction with the accompanying drawings of which.

Figure 1:
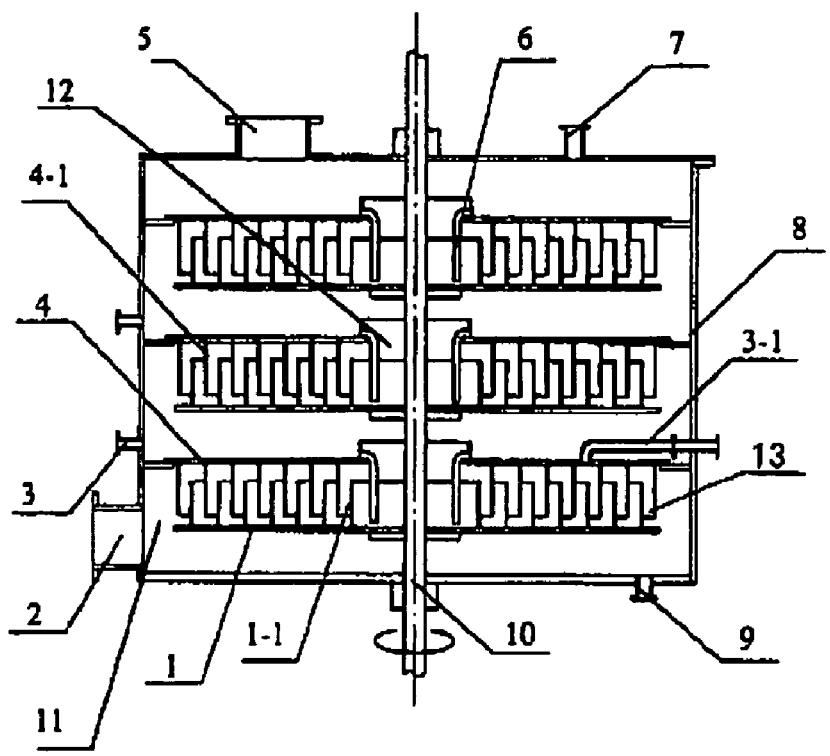
FIG. 1 is a schematic view of the structure of the equipment of multi-rotors zigzag high-gravity rotating beds according to the present invention.

The correspondence between the reference signs in the figures and the respective components in the description are listed below:

1—mobile disk, 1-1—mobile baffle-sheet, 1-1-1—hole, 2—gas inlet, 3—middle feed inlet, 3-1—middle feed inlet tube, 4—immobile disk, 4-1—immobile baffle-sheet, 5—gas outlet, 6—directing tube, 7—liquid inlet, 8—casing, 9—liquid outlet, 10—rotating shaft, 11—the first passage, 12—the second passage, 13—zigzag channel.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Embodiment 1

Figure 2:
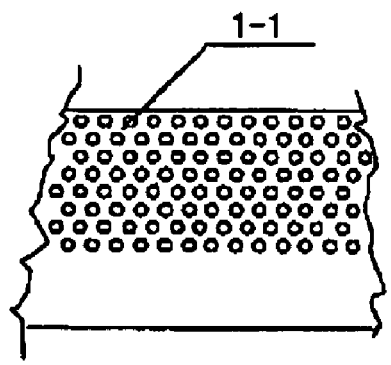
FIG. 2 is an enlarged schematic view of a part of the mobile baffle-sheet in the equipment of multi-rotors zigzag high-gravity rotating beds according to the first embodiment of the present invention.

FIG. 1 is a schematic view of the structure of the equipment of multi-rotors zigzag high-gravity rotating beds according to the present invention. FIG. 2 is an enlarged schematic view of a part of the mobile baffle-sheet in the equipment of multi-rotors zigzag high-gravity rotating beds according to the first embodiment of the present invention.

As illustrated in FIGS. 1 and 2, the equipment of multi-rotors zigzag high-gravity rotating beds comprises a casing 8. There are a gas inlet 2 and a liquid outlet 9 on the bottom of the casing 8, and a gas outlet 5 and a liquid inlet 7 are provided on the top of casing 8. A rotating shaft 10 is provided at the center of the casing 8 and pass through the two ends of the casing 8. Three layers of rotors are installed in series on the rotating shaft 10 up and down. The rotor comprises a mobile disk 1 fixed on the shaft 10 and an immobile disk 4 fixed on the casing 8. The immobile disk 4 is placed on the supporting ring fixed on the inner wall of the casing 8, mobile baffle-sheets 1-1 and immobile baffle-sheets 4-1 are fixed on the mobile disk 1 and immobile disk 4 respectively. A series of concentrical mobile baffle-sheets 1-1 and immobile baffle-sheets 4-1 with different diameters are assembled in a staggered form to form a zigzag channel 13 for mass transfer and heat transfer between gas and liquid. The feed can be liquid, gas or a mixture of gas and liquid. A series of holes are perforated on the upper portion of the mobile baffle-sheets 1-1. The first passage 11 is set at the two downsides of the rotor, and the second passage 12 is set at the center on the top of the rotor. The first passage 11 and the second passage 12 are communicated with the zigzag channel 13. The second passage 12 on the top rotor in the casing is communicated with the gas outlet 5 and the liquid inlet 7, and the first passage 11 of the bottom rotor in the casing 8 is communicated with the gas inlet 2 and the liquid outlet 9. The second passage 12 of the other rotors is communicated with the first passage 11 of the above rotor. The first passage 11 is formed by the space between the two sides of the mobile disk 1 and the inner wall of the casing 8, while the second passage 12 is formed by the eye (central hole) in the immobile disk 4. There is a directing tube 6 in the second passage 12. The directing tube 6 is led to the bottom of the second passage 12. There are middle feed inlets 3 at the two sides of the casing 8. The middle feed inlet 3 at one side is communicated with the first passage 11, which is in turn communicated with the zigzag channel 13. The middle feed inlet 3 at the other side is communicated with the zigzag channel 13 of a middle immobile baffle-sheet 4-1 via a feed tube 3-1.

Gas enters from gas inlet 2, firstly entering the bottom rotor, entering the channel 13 through the first passage 11, flowing into the rotor from outside, and finally flowing out from the second passage 12 at the center. The gas from the second passage 12 then flows into the first passage 11 of the above rotor, like this, the gas flows up through every layers of rotors, at last, out from the second passage 12 of the top rotor and out from the casing 8 via the gas outlet 5. On the other hand, liquid enters from the liquid inlet 7, and then flows through the same path, but in opposite direction to the gas current, and finally flow out by the liquid outlet 9. In the flowing process of gas and liquid, the contact is sufficient between gas and liquid driven by the mobile disk 1 under high-speeds rotation.

The operating principle of this invention is explained as follows by combining several examples of application:

1. An example of application to distillation process is now described. The vapor from a reboiler enters the casing 8 from the gas inlet 2, firstly entering the bottom rotor by the first passage 11, and flowing from outside to inside of the rotor in "S" form along the channel 13 composed by the mobile disk 1, the immobile disk 4, the mobile baffle-sheet 1-1 and the immobile baffle-sheet 4-1, then flowing out through the second passage 12 at the center of the rotor and entering the first passage 11 of the above rotor. In this way, the gas flows up through every rotors in the casing 8 and finally enters a condenser via the gas outlet 5 and is condensed as distilled products C. On the other hand, some condensate as reflux liquid enters the casing 8 through the liquid inlet 7, flows through the zigzag channel 13 in a direction opposite to the vapor flow, and is repeatedly thrown onto the concentric immobile baffle-sheets 4-1 in the zigzag channel 13 by the concentric mobile baffle-sheets 1-1 rotating in high speed. The mist droplets splashed from the immobile baffle-sheet 4-1 contact counter-currently with the vapor and carry out mass transfer between vapor and liquid. The liquid enters the reboiler via liquid outlet 9 and is heated again, and the distilled product d in liquid state is discharged from the reboiler. The feed can enter the top of the immobile disk 4 through the middle feed inlet 3 and flow onto the center of the mobile disk 1 via the directing tube 6, or the feed can enter the channel 13 through the immobile disk 4 from the middle feed inlet 3-1, participating in mass transfer and heat transfer between vapor and liquid. The feed can be liquid, gas or a gas-liquid mixing.

In this example, as the mobile and immobile baffle-sheets are alternately and concentrically arranged in the rotors, in the process for liquid moving from the center to the outskirt of the rotors, the liquid rotates by the drive of the concentrical mobile baffle-sheets 1-1, goes up along the mobile baffle-sheets. The liquid surface is therefore renewed continuously, and the liquid is thrown out from the holes of the concentrical mobile baffle-sheets. Then, the liquid with radial and tangential velocity impacts the concentrical immobile baffle-sheets 4-1 and is smashed into a great deal of liquid droplets under impacting and tangential force. The liquid droplets move downward under gravity force and contact with the going-up vapor counter-currently. The specific area of the liquid droplets is very large for the liquid droplets are very small. Moreover, the droplet surface is newly-exposed by smash, so, during this process, the vapor and the liquid droplets contact sufficiently, decreasing the resistance of mass transfer and increasing the rate of mass transfer. After the vapor and the liquid contact each other countercurrently and repeatedly in the rotor, high mass transfer efficiency can be gained. In the present example, using methanol and water system, under rotating speed of 1000 rpm, the ZRB has been applied to distillation process, and the main data are as follows: The methanol mass concentration of feed is 70%, the methanol mass concentration of product is larger than 99.7%, the methanol concentration of residual liquid is less than 0.5% and the product output is 500 kg/h.

2. An example of application to absorption or desorption process is now described. Gas enters the zigzag channels 13 of the rotors from the gas inlet 2, flowing in "S" form from the outside to the inside of the rotors, at last being discharged from the gas outlet 5. On the other hand, liquid enters the zigzag channels 13 of the rotors from the liquid inlet 7 and is repeatedly thrown onto the concentrical immobile baffle-sheets 4-1 by the concentrical mobile baffle-sheets 1-1, smashed into mist droplets, contacting with gas counter-currently and carrying out mass transfer. At last the liquid is discharged by the liquid outlet 9.

In this example, the liquid undergoes the moving-smashed-still-moving process repeatedly, which not only increases the mass transfer area, but also extends the resident time, increasing the theoretical plates greatly and having great practical value.

3. An example of application to gas-liquid chemical reaction which produces liquid products or liquid and gas products is now described. The gas enters the zigzag channels of the rotors by the gas inlet 2, flowing in "S" form from the outside to the inside of the rotors, and reacts with the liquid reactant moving also in "S" form from the inside to the outside of the rotor via the zigzag channels. The liquid product produced by the reaction moves from the inside to the outside of the rotor by the zigzag channels and is discharged from the liquid outlet 9. On the other hand, the gas product produced by the reaction flows from the outside to the inside of the rotor, and at last is discharged by gas outlet 5 from the equipment. In the process, the liquid reactant enters the zigzag channels of the rotors by the liquid inlet 7 and is repeatedly thrown onto the concentrical immobile baffle-sheets 4-1 by the concentrical mobile baffle-sheets rotating at high speed, smashed into mist droplets, contacting with the gas counter-currently and carrying out reaction, mass transfer and heat transfer. At last, the liquid product produced by the reaction is discharged by liquid outlet 9.

In this example, the liquid undergoes the moving-smashed-still-moving process repeatedly, which not only increases the mass transfer area, the heat transfer area and the reaction contacting area, but also extends the resident time of the gas and liquid, so that the chemical reaction rate controlled by mass transfer rate can be increased significantly.

Embodiment 2

Figure 3:
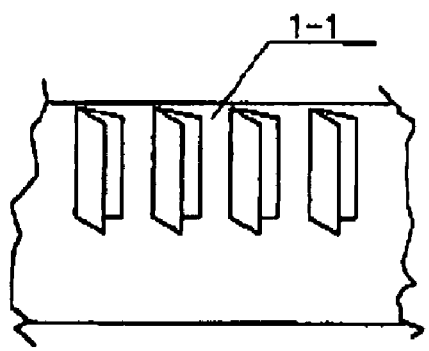
FIG. 3 is an enlarged schematic view of a part of the mobile baffle-sheet in the equipment of multi-rotors zigzag high-gravity rotating beds according to the second embodiment of the present invention.

FIG. 3 is an enlarged schematic view of a part of the mobile baffle-sheet in the equipment of multi-rotors zigzag high-gravity rotating beds according to the second embodiment of the present invention.

The equipment of multi-rotors zigzag high-gravity rotating beds according to the second embodiment is the same as that of the first embodiment except the structure of the mobile baffle-sheet. Specifically, as illustrated in FIG. 3, the upper portion of the mobile baffle-sheet 1-1 in FIG. 3 is opened in a jalousie form, and the jalousie direction can be clockwise or counter clockwise.

Embodiment 3

Figure 4:
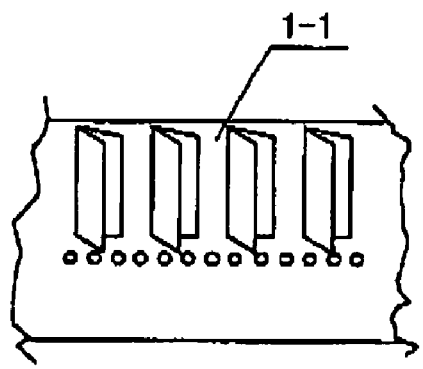
FIG. 4 is an enlarged schematic view of a part of the mobile baffle-sheet in the equipment of multi-rotors zigzag high-gravity rotating beds according to the third embodiment of the present invention.

FIG. 4 is an enlarged schematic view of a part of the mobile baffle-sheet in the equipment of multi-rotors zigzag high-gravity rotating beds according to the third embodiment of the present invention.

The equipment of multi-rotors zigzag high-gravity rotating beds according to the third embodiment is the same as that of the first embodiment except the structure of the mobile baffle-sheet. Specifically, as illustrated in FIG. 4, the upper portion of the mobile baffle-sheet 1-1 is opened in a jalousie form and is additionally perforated a line of holes.

Although a few preferred embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An equipment of multi-rotors high gravity rotating beds, comprising:
    a casing;
    a gas inlet and a liquid outlet provided on a bottom of the casing;
    a gas outlet and a liquid inlet provided on a top of the casing;
    a rotating shaft provided at a center of the casing and passing through the casing;
    a series of rotors installed in layers from top to bottom on the rotating shaft, wherein each of the rotors includes a mobile disk fixed on the rotating shaft, an immobile disk positioned over the mobile disk in the casing, a series of mobile baffle-sheets and immobile baffle-sheets made of circular sheet being provided on the mobile disk and the immobile disk, respectively, the mobile baffle-sheets and the immobile baffle-sheets being positioned opposite to each other and being arranged in a staggered form to form a zigzag channel, a first passage being formed circumferentially at a downside of the rotor and a second passage being formed at a center on a top of the rotor, both of the first passage and the second passage being communicated with the zigzag channel; and
    a middle feed inlet provided on the casing and communicated with the zigzag channel.

2. The equipment of multi-rotors high gravity rotating beds according to claim 1, wherein the first passage is formed by a space between a side of said mobile disk and an inner wall of said casing, and the second passage is formed by a central hole of said immobile disk.

3. The equipment of multi-rotors high gravity rotating beds according to claim 1, wherein a directing tube is provided in the second passage and is extended to a bottom of the second passage.

4. The equipment of multi-rotors high gravity rotating beds according to claim 1, wherein said middle feed inlet is communicated with the first passage communicated with the zigzag channel.

5. The equipment of multi-rotors high gravity rotating beds according to claim 1, wherein said middle feed inlet is communicated with said zigzag channel at a middle immobile baffle-sheet via a feed tube.

6. The equipment of multi-rotors high gravity rotating beds according to claim 1, wherein the sheet used for making said mobile baffle-sheet is perforated at the an upper portion thereof.

7. The equipment of multi-rotors high gravity rotating beds according to claim 1, wherein the sheet used for making said mobile baffle-sheet is formed with a structure in jalousie form at the upper portion thereof, the jalousie can be clockwise or counter clockwise.

8. The equipment of multi-rotors high gravity rotating beds according to claim 1, wherein the sheet used for making said mobile baffle-sheet is perforated and formed with a structure in jalousie form at the upper portion thereof.

\* \* \* \* \*